United States Patent [19]

Komoto

[11] Patent Number: 4,548,288

[45] Date of Patent: Oct. 22, 1985

[54] ELECTRONIC BALANCE

[75] Inventor: Akira Komoto, Shiga, Japan

[73] Assignee: Shimadzu Corporation, Kyoto, Japan

[21] Appl. No.: 577,669

[22] Filed: Feb. 7, 1984

[30] Foreign Application Priority Data

Feb. 9, 1983 [JP] Japan .................................. 58-20359

[51] Int. Cl.⁴ ........................ G01G 21/28; G01G 7/00;
G01G 21/28; G01G 23/00
[52] U.S. Cl. ................................... 177/180; 177/212;
177/243; 177/245
[58] Field of Search ............... 177/180, 181, 212, 238,
177/243, 245

[56] References Cited

U.S. PATENT DOCUMENTS 4,320,809 3/1982 Knothe et al. ...................... 177/243
4,372,406 2/1983 Komoto et al. ..................... 177/212

FOREIGN PATENT DOCUMENTS 2076543 12/1981 United Kingdom .

Primary Examiner—George H. Miller, Jr.
Attorney, Agent, or Firm—Koda and Androlia

[57] ABSTRACT

An electronic balance made free from an error due to ambient temperature variations is disclosed. The balance is characterized in that an electromagnetic force transducer used therein is encased in a constant-temperature casing provided with through hole at the bottom through which a force transmitting means penetrates connecting between a weighing tray and an electromagetic force-coil of said electromagnetic force-transducer. The constant-temperature casing is temperature-controlled at a constant temperature higher than room temperatures to keep said electromagnetic force-transducer free from the effect of ambient room temperature variations.

6 Claims, 6 Drawing Figures weight signal output $\sigma = 0.05\,mg$ $\sigma = 0.16\,mg$

ELECTRONIC BALANCE

BACKGROUND OF THE INVENTION

The present invention relates to an electronic balance, and more particularly to a precision electronic balance made free from ambient temperature variations. Electronic balances are generally devised to weigh a loaded weight by making the weight balanced with a force produced by an electronic force-transducer. The force-transducer consists of a magnetic circuit and an electromagnetic force-coil kept movable in the static-magnetic field made by the magnetic circuit. The electromagnetic force-coil is supplied with a current controlled automatically by an electronic feedback circuit so as to make the force-coil produce current just balancing the weight. The weight value is obtained from measuring the current. An example of such electronic balances is disclosed in the U.S. Pat. No. 4,372,406, while a force-transducer usable in an electronic balance is disclosed, for instance, in the UK patent application GB No. 2 076 543 A.

Electronic balances, particularly precision ones for analytical use have come to show a relative sensitivity of $5 \times 10^{-7}$, the ratio of a minimum scaling division to a maximum weighing capacity. On the other hand it is an important disadvantage of electronic balances that the force-transducer and electronic circuit are likely to be affected by the ambient temperature. In the present state of technology, weighed-value fluctuations due to the effect of ambient temperature variations on the force-transducer and electronic circuit can not be suppressed to a value lower than $1 \sim 2 \times 10^{-6}$/day by a usual method of temperature compensation. In using a precision electronic balance, therefore, the temperature of the whole room must be controlled so as not to fluctuate over 0.5° C. from a constant temperature. The requirement of such severe temperature control has restricted the place where a precision electronic balance can satisfactorily be used.

OBJECTS AND SUMMARY OF THE INVENTION

Accordingly, it is an important object of the present invention to provide an electronic balance which is free from an error due to ambient temperature variations. Another object of the present invention is to constitute such an electronic balance in a relatively simple structure and at a low cost.

For attaining the objects, an electronic balance according to the present invention has its force-transducer enclosed in a casing which is temperature-controlled at a constant value higher than the ambient room temperature, the casing having at the bottom a through hole through which a force transmitting means penetrates connecting between the weighing tray and (the force-coil of) the force-transducer.

BRIEF DESCRIPTION OF THE DRAWINGS

The present invention will further described in detail hereinafter in reference to the accompanying drawings, in which.

DETAILED DESCRIPTION OF THE INVENTION

Figure 1:
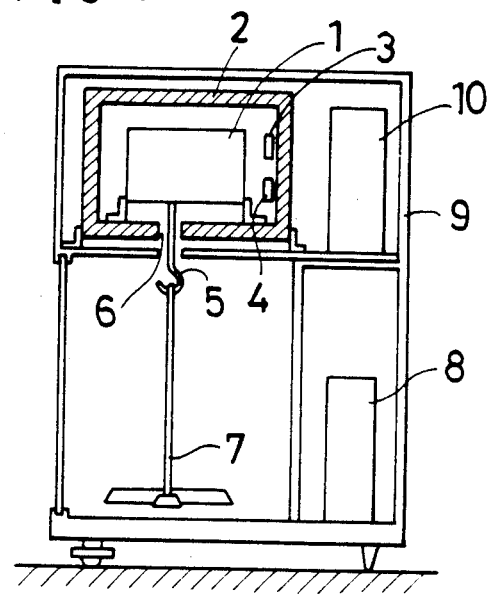
FIG. 1 shows a partially cross-sectional side view of an embodiment of the present invention.

In FIG. 1, which shows an embodiment of the present invention, a force-transducer 1 is encased in a constant-temperature casing 2 (cross-sectional), together with a heater unit 3 and a temperature sensor 4. From the transducer 1 a force transmitting means 5 constituted as a hook extends downward through a through hole 6 provided at the bottom of the casing 2. A weighing tray 7 hangs down from the hook. An electronic circuit casing 10 contains both a transducer control circuit and a temperature control circuit for controlling the temperature of the casing 2 according to the output signal from the temperature sensor 4. These control circuits are power-supplied from a power source 8.

Figure 2:
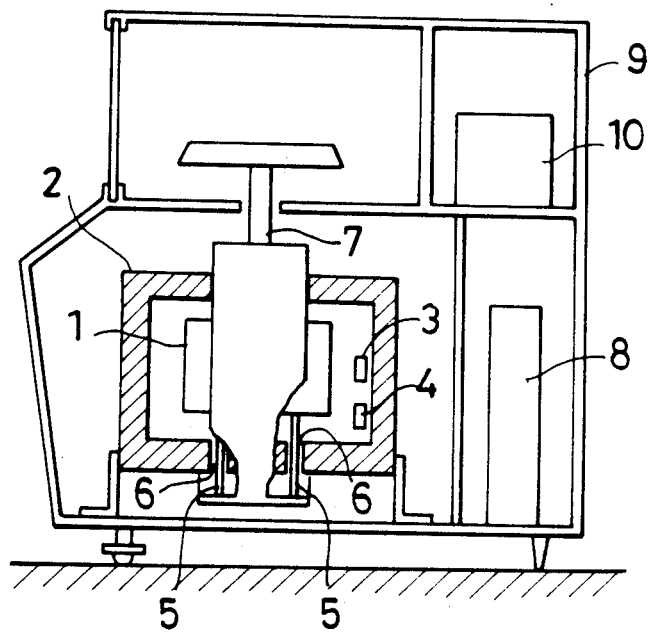
FIG. 2 shows a partially cross-sectional and partially cut out side view of another embodiment of the present invention.

In case a weighing tray 7 is supported upward by a force-transducer placed under the tray 7, the present invention can be executed as shown in FIG. 2, in which all of the elements corresponding to those in FIG. 1 are indicated with the same numerical numbers that are used in FIG. 1. In this embodiment the constant-temperature casing 2 is provided with a plurality of through holes 6 corresponding to the number of the force-transmitting means 5.

Figure 4:
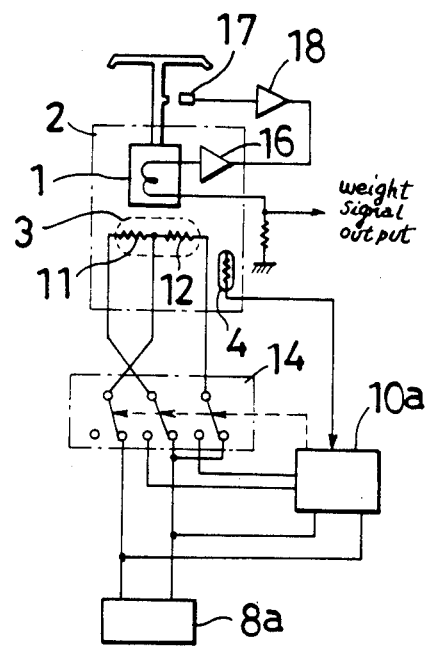
FIG. 4 diagramatically shows a circuit for controlling the temperature of the constant-temperature casing used in each of the above embodiments, together with a force-transducer control circuit.
Figure 3:
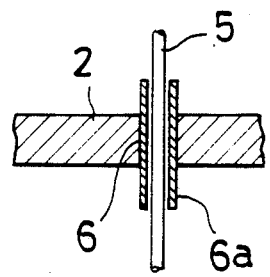
FIG. 3 shows an example of the through hole provided at the bottom of the constant-temperature casing used in the embodiments shown in FIGS. 1 and 2.

In the above two embodiments the through hole 6 is sized so that a clearance between the through hole and the force transmitting means 5 may be narrow enough to prevent a heat convection from occuring between the inside of the casing 2 and the surrounding atmosphere. As is shown in FIG. 3, the through hole 6 can be provided with a sleeve 6a to increase the effect of preventing the heat convection. FIG. 4 shows a temperature control circuit used in the above embodiments, together with a transducer control circuit. In the beginning, two heaters 11 and 12, which constitute a heater unit 3 in FIGS. 1 and 2, are series-connected and supplied with an uncontrolled current directly from a power source 8a until the temperature in the casing 2 rises up to a predetermined value at which the temperature should be controlled. Once the inside of the casing 2 is heated up to the predetermined temperature, which is of course higher than the room temperature, the temperature control circuit 10a (housed in the electronic circuit casing 10 in FIGS. 1 and 2) actuates a switching element 14 to change the heater connection to the state of parallel connection. The heaters 11 and 12 are thereafter subjected to a control by the control circuit 10a. The casing 2 is thus kept at a predetermined constant temperature higher than the room temperature. Reference numbers 18, 17 and 16 indicate a weighing tray displacement detector, an error voltage amplifier and a current amplifier, respectively. These elements constitute a force-transducer control circuit. The current amplifier 16 (not shown in FIGS. 1 and 2) is placed in the casing 2 together with the heater unit 3 for the purpose of supplementarily utilizing its heat dissipation for heating the casing 2.

Figure 5:
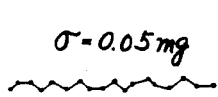
FIG. 5 shows a weighed-value fluctuation in case the constant-temperature casing is provided with a through hole at the bottom.
Figure 6:
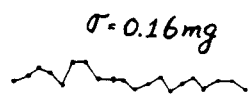
FIG. 6 shows, for a comparison, a weighed-value fluctuation in case the constant-temperature casing is provided with a through hole on the ceiling.

FIG. 5 shows a weighed-value fluctuation of the above embodiments, while FIG. 6 shows a weighed-value fluctuation in case the through hole 6 of the constant-temperature casing 2 is provided on the ceiling.

In practice it is preferable to make the power supply circuit in a manner in which a power source (not shown in FIG. 4) for the force-transducer control circuit can not be switched on unless the power source 8a for the temperature control circuit is switched on and the casing 2 is heated up to a predetermined constant temperature.

As is easily understood from the above description an electronic balance according to the present invention is made free from an error due to ambient room temperature variations because the force-transducer is always kept at a constant temperature.

What is claimed is:

1. An electronic balance which uses as a force for balancing a weight loaded on a weighing tray a force produced by an electromagnetic force-transducer consisting of a magnetic circuit and an electromagnetic force-coil kept movable in the static field made by said magnetic circuit said electronic balance comprising:
   a constant-temperature casing enclosing said force-transducer therein, and being provided with a through hole at the bottom through which a force transmitting means penetrates connecting between said weighing tray and said electromagnetic force-coil of said electromagnetic force-transducer;
   a heater for heating up said constant-temperature casing at a predetermined constant temperature higher than room temperatures;
   a temperature sensor for detecting the temperature inside said constant-temperature casing; and
   an electronic control circuit for controling said heater according to the output signal from said temperature sensor.

2. An electronic balance as defined in claim 1, wherein said through hole is provided with a sleeve surrounding said force transmitting means penetrating through said hole.

3. An electronic balance defined in claim 2, wherein a dissipated heat from an electronic power element used in the circuit for controlling said electromagnetic force-transducer is supplementarily utilized for heating up said constant-temperature casing.

4. An electronic balance defined in claim 2 or 3 wherein said predetermined constant temperature can be chosen at any value higher than room temperatures.

5. An electronic balance defined in claim 2 or 3, wherein unless said heater is energized, all of the other circuits in said electronic balance can not be energized.

6. An electronic balance as defined in claim 5, wherein said predetermined constant temperature can be chosen at any value higher than room temperature.

* * * * *